(12) United States Patent
Hocquard et al.

(10) Patent No.: US 10,545,858 B2
(45) Date of Patent: Jan. 28, 2020

(54) METHOD FOR TESTING A GRAPHICAL INTERFACE AND CORRESPONDING TEST SYSTEM

(71) Applicant: ALSTOM Transport Technologies, Saint-Ouen (FR)

(72) Inventors: Arnaud Hocquard, Bievres (FR); Pierre Dumas, Pont-l'Abbe (FR)

(73) Assignee: ALSTOM Transport Technologies, Saint-Ouen (FR)

( * ) Notice: Subject to any disclaimer, the term of this patent is extended or adjusted under 35 U.S.C. 154(b) by 125 days.

(21) Appl. No.: 15/643,631

(22) Filed: Jul. 7, 2017

(65) Prior Publication Data
US 2018/0011784 A1 Jan. 11, 2018

(30) Foreign Application Priority Data
Jul. 7, 2016 (FR) ..................................... 16 56563

(51) Int. Cl.
*G06F 11/36* (2006.01)
*G06T 7/73* (2017.01)
*G06F 3/0484* (2013.01)

(52) U.S. Cl.
CPC ...... *G06F 11/3692* (2013.01); *G06F 11/3684* (2013.01); *G06F 11/3688* (2013.01);
(Continued)

(58) Field of Classification Search
CPC ................................................. G06F 11/3692
(Continued)

(56) References Cited

U.S. PATENT DOCUMENTS

| 7,359,820 B1* | 4/2008 | Browne | ............... G06F 11/3688 702/108 |
| 2008/0127045 A1* | 5/2008 | Pratt | ....................... G06F 9/454 717/104 |

(Continued)

FOREIGN PATENT DOCUMENTS

| EP | 0869433 A2 * | 10/1998 | .......... G06F 11/3664 |
| EP | 0869433 A2 | 10/1998 | |

OTHER PUBLICATIONS

French Search Report for FR Application 1656563 dated Nov. 23, 2016.

*Primary Examiner* — Chat C Do
*Assistant Examiner* — Bradford F Wheaton
(74) *Attorney, Agent, or Firm* — Thompson Coburn LLP; Bradley H. Thomas

(57) ABSTRACT

This test method for validating a specification of a graphical interface consists of developing a scenario file corresponding to the validation test to be performed. The scenario file includes a plurality of instructions, in a natural programming language, each instruction including a function, parameters and an expected state of the graphical interface following the application of the function. The test is automatically performed by interpreting the scenario file so as to generate commands intended for an engine capable of interacting with the graphical interface and monitoring the evolution of its current state, and then analyzing a result file associating each instruction of the scenario file with a result corresponding to the comparison of the current state of the graphical interface following the application of the corresponding command with the expected state.

8 Claims, 2 Drawing Sheets

(52) U.S. Cl.
CPC ............ *G06T 7/74* (2017.01); *G06F 3/04842* (2013.01); *G06T 2200/24* (2013.01)

(58) Field of Classification Search
USPC ........................................................ 717/124
See application file for complete search history.

(56) References Cited

U.S. PATENT DOCUMENTS

| | | | |
|---|---|---|---|
| 2009/0167882 A1* | 7/2009 | Chen | G06K 9/00335 348/222.1 |
| 2011/0276944 A1 | 11/2011 | Bergman et al. | |
| 2013/0301911 A1* | 11/2013 | Rong | G06K 9/00369 382/160 |
| 2015/0082280 A1 | 3/2015 | Betak et al. | |

* cited by examiner

METHOD FOR TESTING A GRAPHICAL INTERFACE AND CORRESPONDING TEST SYSTEM

CROSS-REFERENCE TO RELATED APPLICATIONS

This application claims the benefit of FR Application No. 16 56563, filed Jul. 7, 2016, which is incorporated herein by reference in its entirety.

BACKGROUND

The invention relates to the field of testing a graphical interface allowing a user to interact with a control-command system.

More particularly, the invention is dedicated to tests for a graphical interface that may be found in the railway field.

To date, the methods for testing a graphical interface, seeking to verify that it meets a certain number of specifications, are essentially done manually.

Such a method first consists of determining the specifications of the graphical interface to be tested.

Next, one or several scenarios are defined making it possible to verify that the graphical interface meets a given specification. A scenario groups together a series of events, in particular interaction events by an operator with the graphical interface and reaction events of the graphical interface following an interaction.

Next, a test of the graphical interface is carried out according to a selected scenario. To do this, an operator performs the series of events indicated in the selected scenario. In particular, the operator performs the interaction events (movement of a cursor, action associated with the current position of the cursor, data entered using a keyboard, etc.) and notes the reaction events that follow an interaction (opening of a window, state change of an indicator, evolution of the displayed property, etc.).

According to the scenario, the operator verifies that the reaction event by the graphical interface in fact corresponds to the expected reaction event indicated in the scenario. In the case of a negative verification, i.e., the graphical interface behaves differently than what is expected, the operator fills out a test report.

At the end of a test, optionally repeated a certain number of times, the analysis of the test report makes it possible to identify the malfunctions of the graphical interface relative to what is expected and to correct the graphical interface accordingly.

This approach is very expensive. Indeed, it involves having an operator conduct a test that may be very lengthy, and that oftentimes must be repeated many times to validate an interface with certainty.

The quality of these tests is not guaranteed, since they involve an operator, whose concentration may not be constant throughout the test.

Lastly, this type of test is time-consuming, since an operator can only work effectively for a certain number of hours per day.

Consequently, there is a need to automate such a test method so as to decrease the costs of the step for validating a graphical interface, increase the quality of this validation step, and reduce the time of this validation step.

The invention aims to meet this need.

SUMMARY

To that end, the invention relates to a method for testing a graphical interface, characterized in that it includes, to perform a validation test automatically for a specification of the graphical interface, the following steps:
developing a scenario file corresponding to the validation test to be performed, including a plurality of instructions written in a natural programming language, each instruction including a function, parameters of said function and an expected state of the graphical interface following the application of said function; automatically performing the test, interpreting the scenario file so as to generate a plurality of commands intended for an engine capable of interacting with the graphical interface and monitoring the evolution of the current state of the graphical interface; and analyzing a result file associating each instruction of the scenario file with a result corresponding to the comparison of the current state of the graphical interface following the application of the corresponding command with the expected state.

According to specific embodiments, the method includes several of the following features, considered alone or according to any technically possible combinations:
- the step consisting of performing the test includes the following steps: the interpretation, by a driver, of the scenario file, by reading each instruction from the scenario file, extracting the natural language used to write an instruction from that instruction and only considering the function of this instruction and the parameters of this function, so as to generate a corresponding command; sending the command and the expected state of the graphical interface to the engine.
- the step consisting of performing the test includes the following steps: the execution, by the engine, of a received command so as to carry out the corresponding interaction on the graphical interface; the monitoring of the graphical interface by the engine; the comparison, by the engine, of the current state of the graphical interface with the expected state as received and the generation of the results of comparison.
- In which method: in case of normal operation of the graphical interface, i.e., when the current state corresponds to the expected state, the result of the comparison assumes a value "OK"; and in case of abnormal operation of the graphical interface, i.e., when the current state differs from the expected state, the result of the comparison assumes a value "NOK".
- the comparison step includes a screenshot, by the engine, of the graphical interface in its current state.

The invention also relates to a system for testing a graphical interface, characterized in that it is programmed to execute a test program capable of implementing a test method according to the above method.
- the test program includes an environment, a driver and an engine, such that: the environment allows an operator to develop a scenario file consisting of a list of instructions; the driver is able to interpret each instruction from the scenario file so as to generate, for each instruction, at least one equivalent command and to send the command to the engine; the engine is able to interact with the graphical interface according to the received command and to monitor the current state of the graphical interface.
- an instruction, written in a script language, includes a function, parameters of this function, an expected state of the graphical interface following the application of this function, and generic terms allowing the instruction to correspond to natural language.

BRIEF DESCRIPTION OF THE DRAWINGS

The invention and its advantages will be better understood upon reading the following detailed description of one particular embodiment, provided solely as an illustrative and non-limiting example, this description being done in reference to the appended drawings, in which.

DETAILED DESCRIPTION

Figure 1:
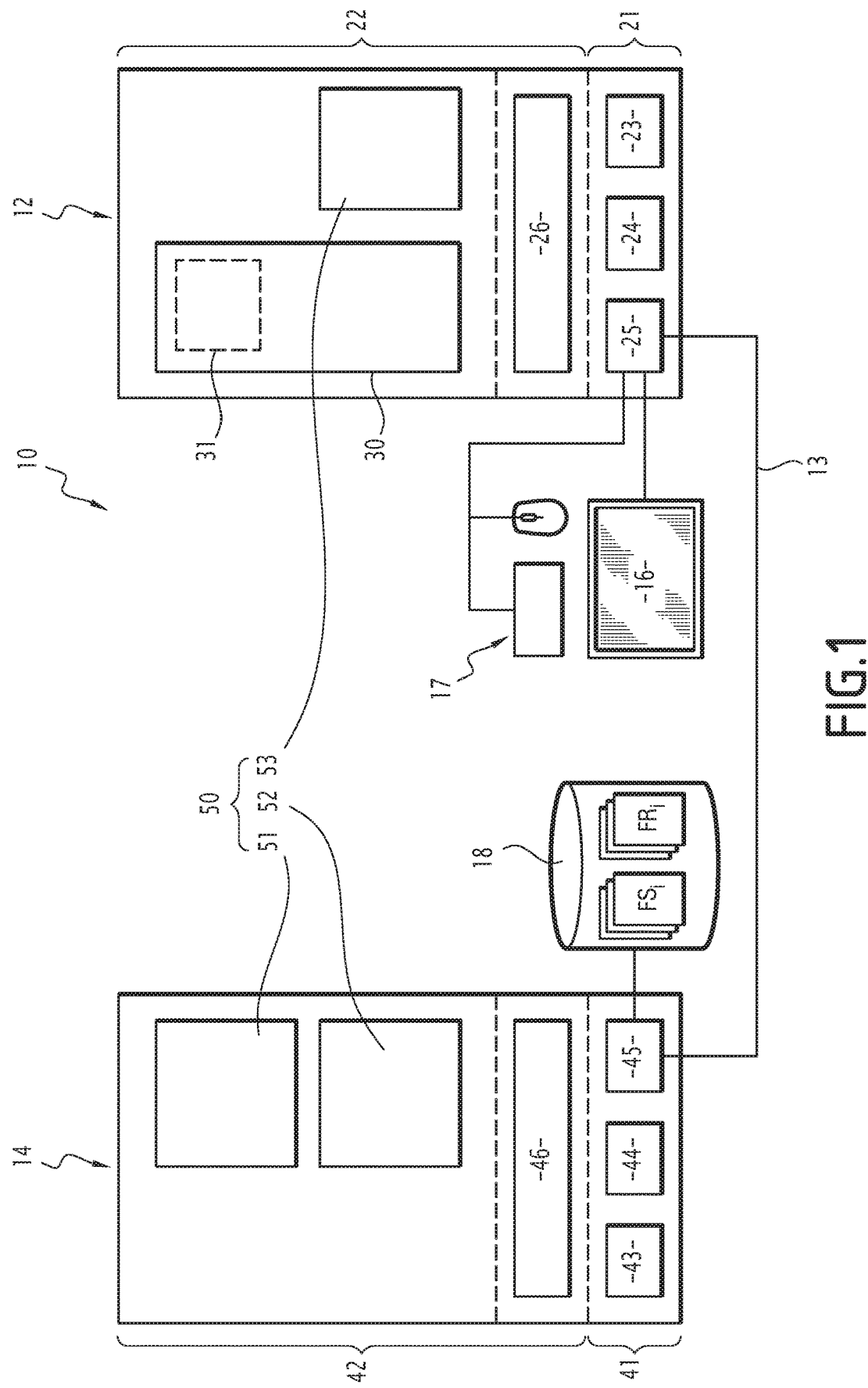
FIG. 1 is a schematic illustration of a computer system making it possible to carry out the test method according to the invention.

FIG. 1 is a schematic illustration of a computer system 10 making it possible to implement the test method according to the invention.

The system 10 includes a test computer 12 and a control computer 14, connected to one another by a communication network 13.

Generally, the computer 12 includes a hardware layer 21 and a software layer 22.

The hardware layer 21 includes computing means 23, such as a processor, storage means 24, such as a memory, and input-output means 25, in particular so as to connect the computer 12 to the network 13, a display monitor 16 and entry means 17, such as a keyboard and a pointing device, for example a mouse. The keyboard for example makes it possible to enter a string of characters in an entry field. The mouse makes it possible to move a cursor on the monitor 16 and to perform associated actions in the location where this cursor is found (right click, left click, double-click, etc.).

The storage means in particular includes the computer program instructions able to be executed by the computing means.

The software layer 22 includes a program for virtualizing the hardware layer, also called operating system 26, and a plurality of application programs executed in the environment defined by the operating system.

Similarly, the computer 14 includes a hardware layer 41 and a software layer 42.

The hardware layer 41 includes computing means 43, such as a processor, storage means 44, such as a memory, and input-output means 45, in particular so as to connect the computer 42 to the network 43 and to a database 18.

The software layer 42 includes an operating system 46, and a plurality of application programs executed in the environment defined by the operating system.

On the test computer 12, an operational application 30 is executed including a graphical interface part 31, intended to be displayed on the monitor 16 during the execution of the application 30 to display data to an operator and allow this operator to enter data using the entry means 17.

To test the graphical interface 31, the system 10 includes a test program 50 distributed between the computers 12 and 14.

The test program 50 includes a development environment 51, a driver 52 and an engine 53.

In the embodiment shown in FIG. 1, the development environment 51 and the driver 52 are executed on the control computer 14, while the engine 53 is executed on the test computer 12.

The engine 53 is able to interact with and monitor the graphical interface 31 displayed on the controlled monitor 16.

Such an engine 53 is known. It for example involves the SIKULI engine, in its current version 1.1+ (available at the address: http://sikulix-2014.readthedocs.org/en/latest/index.html).

The engine 53 includes a programming interface providing a library of predefined commands, each command corresponding to a possible interaction of the engine with the graphical interface to be monitored. The combination of these commands makes it possible to develop an application interacting automatically with the graphical interface in question.

However, these commands are complex to use.

The invention in particular consists of proposing encapsulating the engine 53 in an interface layer making it possible to access the engine 53 more easily, in particular by showing an end user an environment making it possible to develop applications using a natural language.

This interface layer is made up of the environment 51 and the driver 52.

The environment 51 allows an operator to develop a scenario file FSi.

This file consists of a list of instructions Iij.

Each instruction is written in a script language.

An instruction Iij includes a function, parameters of this function, an expected state Eij of the graphical interface following the application of this function, and generic terms allowing the instruction to correspond to a more natural language for the operator.

Once the scenario file FSi has been developed, it is stored in the database 18.

The environment 51 also allows the operator to select a scenario file FSi from among the set of files in the database 18 and to launch its execution.

The driver 52 allows the execution of a scenario file FSi. It is able to interpret each instruction Iij of this file FSi so as to generate a command message MCij and to apply the latter to the engine 53 via the network 13. A command message MCij includes one or several commands Cij, equivalent to the function of the corresponding instruction Iij, and the expected state Eij at the end of the application of this command Cij.

Figure 2:
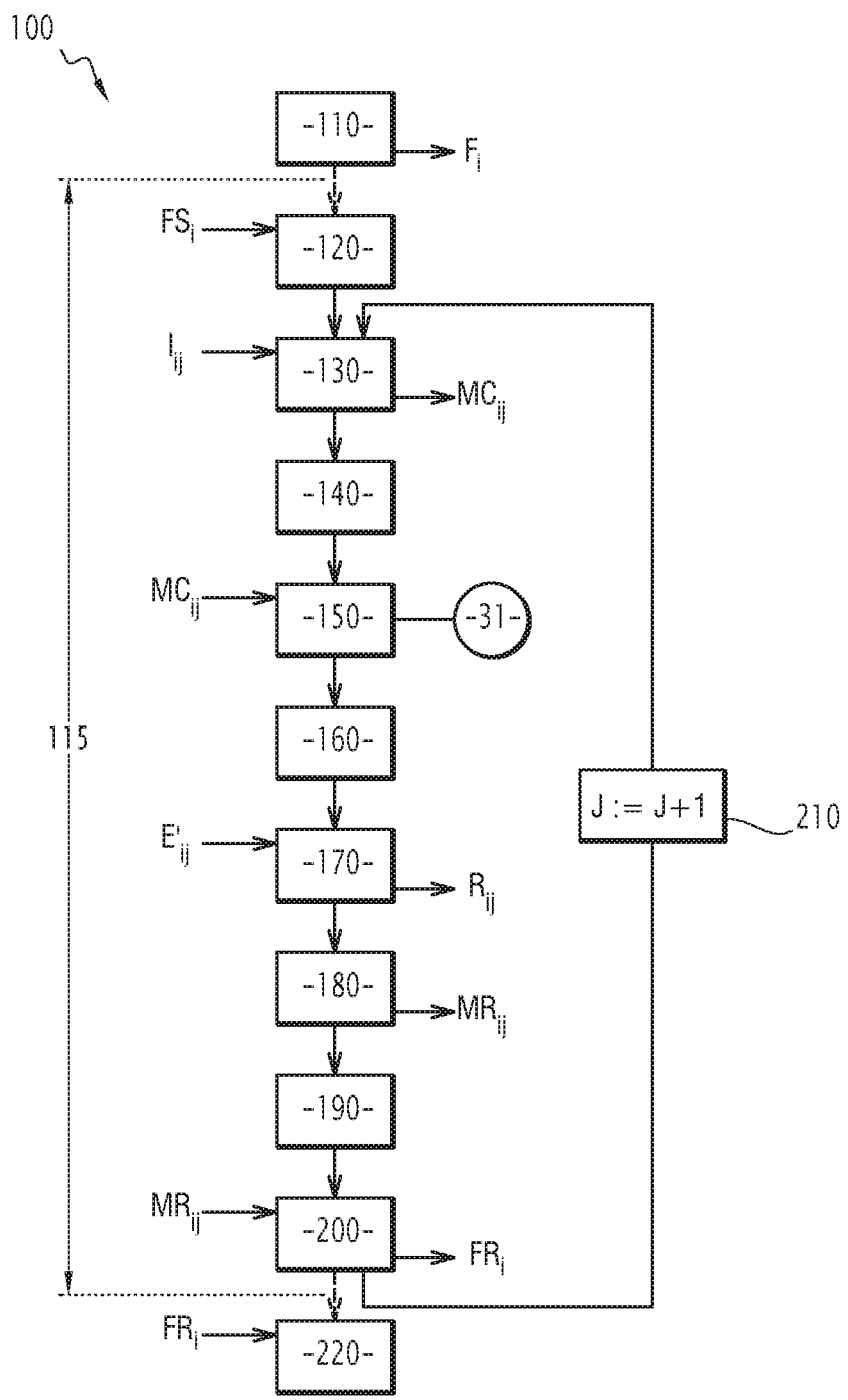
FIG. 2 is a schematic block illustration of the test method according to the invention.

In reference now to FIG. 2, the method for testing a graphical interface 100 according to the invention will be described.

The method 100 begins with a step 110, off-line, consisting of developing at least one appropriate scenario file Fi from at least one specification that the graphical interface 31 must respect. Using the environment 51, an operator uses the script language to write a sequence of instructions Iij to be carried out.

The method 100 continues with a series of online steps, which correspond strictly speaking to the test being performed 115.

Thus, in step 120, the operator chooses to validate a particular specification and chooses the corresponding scenario file FSi. He launches the execution of the test by sending this scenario file Fi to the driver 52.

In step 130, the driver 52 interprets the received scenario file FSi so as to carry out the test scenario. To that end, the driver 52 successively reads each instruction Iij of the scenario file FSi and generates an appropriate command message MCij therefrom.

More specifically, the driver 52 extracts the generic terms of the natural language from an instruction Iij and only considers the function of this instruction and the parameters of this function, so as to generate a corresponding command. The driver 52 therefore includes a match table between a function and one or several commands making it possible to perform the function.

The driver 52 then develops a command message MCij from the obtained command and the expected state Eij of the graphical interface 31, as indicated in the initial instruction from instruction Iij.

In step 140, the driver 52 sends the command message MCij to the engine 53.

In step 150, when the engine 53 receives the command message MCij, it runs the command(s) contained in this message so as to perform the corresponding interaction on the graphical interface 31.

This action may for example consist of moving the cursor over a particular icon of the graphical interface 31 and performing a double-click, or entering a string of characters in a field of the graphical interface 31, etc.

In step 160, after executing the command, the engine 53 monitors the graphical interface 31 so as to determine the evolution of its state, i.e., the reaction of the graphical interface to this interaction.

In step 170, at the end of a time delay configurable in the initial instruction, or upon detection of a change to the graphical interface 31, the engine 53 compares the current state E'ij of the graphical interface 31 with the expected state as indicated in the received command message MCij.

In case of normal operation of the graphical interface 31, i.e., when the current state E'ij corresponds to the expected state Eij, the engine 53 generates a result Rij associated with the instruction Iij assuming the value "OK".

In case of abnormal operation of the graphical interface 31, i.e., when the current state differs from the expected state, the engine 53 generates a result Rij associated with the instruction Iij assuming the value "NOK". The engine 53 then takes a screenshot of the monitor 16.

In step 180, the engine 53 develops a result message including the result Rij, the screenshot if Rij is equal to "NOK", and optionally other information.

In step 190, this result message MRij is sent, via the network 13, to the driver 52.

In step 200, when a result message MRij is received, the driver 52 stores the corresponding information in a results file FRi.

Then, via the loop 210, the method 100 goes to the execution of the following line of the scenario file Fi.

Each line of the scenario file is executed, and the test ends when all of the scenario file Fi instructions have been carried out.

In step 220, off-line, the operator can initiate an analysis of the results file FRi in order to determine the deviations between the anticipated behavior and the actual behavior of the graphical interface 31 of the tested operational application 30.

Many alternatives of the system and method can be considered by one skilled in the art.

Instead of being distributed on two computers, the test application is executed on a single computer, also hosting the application whose graphical interface requires testing.

The application whose graphical interface requires testing may require, during the test, access to other computer systems or appropriate peripherals. These are then connected to the test computer or emulated so as to provide the desired data.

All types of graphical interfaces and interactions with a graphical interface can be tested using the present invention.

Advantageously, the test computer 14 is configured to successively test a plurality of control computers 12.

The test computer 12 is for example intended to be used in a center for supervising railway vehicles, and the graphical interface is then intended, when it is displayed on the monitor 16, to display information relative to the circulation of the railway vehicles in a railway network.

The engine 53 is in particular able to search for reference sub-images, stored by the storage means 24, in an image corresponding to the graphical interface 31 displayed on the monitor 16.

The reference sub-images are images able to be comprised in the image corresponding to the graphical interface 31, in particular when certain actions are carried out via the entry means 17.

To that end, the graphical interface, and in particular the zone of the monitor displaying the graphical interface, is for example broken down into a set of points called pixels. Each image corresponding to the graphical interface is then encoded in the form of a series of sets of bits and comprises as many sets of bits as there are pixels in the zone of the monitor displaying the graphical interface. The value of each set of bits corresponds to the color of a given pixel.

Likewise, each sub-image is encoded in the form of a series of sets of bits.

In the rest of the description, the size of each image corresponding to the graphical interface is considered to be identical, and each sub-image is considered to have dimensions smaller than or equal to the size of the images corresponding to the graphical interface.

The engine 53 advantageously comprises means for comparing the image displayed on the graphical interface 31 with the reference sub-images stored by the storage means 24.

The engine 53 is for example able to compare the series of sets of bits of the image corresponding to the graphical interface 31 displayed on the monitor 16 with the series of sets of bits of one of the reference sub-images, in order to identify the presence of the reference sub-image in the image displayed on the monitor 16 and the position of the reference sub-image on the monitor, i.e., in particular a zone of the graphical interface and in particular of the monitor where the reference sub-image was located.

In the above description, the expected state Eij of the graphical interface for example refers to a pointer to a reference sub-image stored by the storage means 24. Advantageously, the expected state also for example comprises position information of the sub-image, for example relative to a reference point of the screen and/or the graphical interface.

Also advantageously, during step 110 described above, the reference sub-images are for example stored. The reference sub-images for example correspond to images captured during the operation or development of the graphical interface and stored so as to next be able to test the graphical interface and the monitor. The reference sub-images for example comprise a first and second reference sub-image.

Advantageously, during step 150, the engine 53 for example executes the following actions consisting of:
  searching for the first reference sub-image in the image displayed on the monitor and corresponding to the graphical interface,
  identifying the position of the first reference sub-image searched for in the image displayed on the monitor, the first sub-image for example corresponding to a particular icon displayed on the monitor, performing a selection operation in the identified position, the selection operation modifying the image displayed on the monitor; this action for example consists of moving the cursor to the identified position and double-clicking, or clicking after entering a string of characters in the identified position, the sub-image in this specific example corresponding to a field of the graphic interface.

Furthermore, during step 160, the engine 53 searches, for example, for the second reference sub-image in the image displayed on the monitor and corresponding to the graphical interface. The second reference sub-image for example corresponds to an element displayed in the graphic interface after double-clicking on an icon corresponding to the first reference sub-image.

Advantageously, during step 170, in the case where the second reference sub-image has been identified, found during step 160, the engine 53 generates a result Rij associated with the instruction Iij assuming the value "OK".

In the case where the second reference sub-image has not been identified, the engine 53 generates a result Rij associated with the instruction Iij assuming the value "NOK". The engine 53 then for example takes a screenshot of the monitor 16 at the graphical interface 31.

Advantageously, after the identification of the position where the first reference sub-image is displayed, or the zone where the first sub-image is displayed, this position is stored during step 150 and associated with said first reference sub-image. Thus, during a following search of the first reference sub-image at the displayed image corresponding to the graphical interface, the search will be done only or first at the identified position/zone and not in the entire image. The time to perform the search is therefore reduced.

Also advantageously, a same instruction Iij makes it possible to search for a reference sub-image and to store its position the first time it is executed and, the second time it is executed, to search for the sub-image only in this stored identified position.

Advantageously, the characters are treated as reference sub-images, such that character identification is simplified. A reference sub-image is associated with one or several characters.

Also advantageously, during a first search step, the position of a first reference sub-image is identified giving a reference position, and during a second search step, a second reference sub-image is searched for as a function of the identified position of the first reference sub-image. For example, the search is only done in a predetermined zone whose position is defined relative to that of the first reference sub-image.

Also advantageously, to identify the blinking of an image, the search for a first reference sub-image and the search for a second reference sub-image are done in an alternating manner, preferably in a predetermined position.

The other embodiments and alternatives considered above may be combined with one another to create other embodiments of the invention.

The invention claimed is:

1. A method for testing a graphical interface, including, to perform automatically a validation test of a specification of the graphical interface, the steps of:
   developing a scenario file corresponding to the validation test to be performed, including a plurality of instructions written in a natural programming language, each instruction including a function, parameters of said function and an expected state of the graphical interface following the application of said function;
   performing automatically the test by interpreting the scenario file so as to generate a plurality of commands, using an engine interacting with the graphical interface according to the plurality of commands, and monitoring evolution of a current state of the graphical interface during the interaction of the engine with the graphical interface; and
   analyzing a result file associating each instruction of the scenario file with a result corresponding to the comparison of a current state of the graphical interface following the application of the corresponding command with the expected state;
   wherein, during the step of developing a scenario file, reference sub-images that may be comprised in an image corresponding to the graphical interface are stored, the reference sub-images comprise at least a first reference sub-image and a second reference sub-image, and the expected state of the graphical interface is a pointer to a stored reference sub-image;
   wherein the step of performing automatically the test includes the steps of:
      running, by the engine, a received command so as to perform the corresponding interaction on the graphical interface;
      monitoring, by the engine, the graphical interface; and
      comparing, by the engine, a current state of the graphical interface with the expected state received and generating the result of the comparison;
   wherein, during the step of running, by the engine, the engine performs:
      searching for the first reference sub-image in the image corresponding to the graphical interface and displayed on a monitor displaying the graphical interface;
      identifying the position of the first reference sub-image searched for in the image displayed on the monitor; and
      performing a selection operation in the position identified, the selection operation modifying the image displayed on the monitor; and
   wherein, during the step of monitoring, by the engine, the engine searches for the second reference sub-image in the image displayed on the monitor.

2. The method of claim 1, wherein the step of performing automatically the test further includes the steps of:
   interpreting the scenario file by a driver, by reading each instruction from the scenario file, withdrawing from an instruction natural language words used to write the instruction and only considering the function of the instruction and the parameters of the function, so as to generate a corresponding command; and
   sending the command and the expected state of the graphical interface to the engine.

3. The method of claim 1, wherein:
   in a case of normal operation of the graphical interface, the current state corresponds to the expected state, and the result of the comparison assumes a value indicating that the current state corresponds to the expected state; and
   in a case of abnormal operation of the graphical interface, the current state differs from the expected state, and the result of the comparison assumes a value indicating that the current state differs from the expected state.

4. The method of claim 1, wherein the comparing step includes taking, by the engine, a screenshot of the graphical interface in a current state thereof.

5. The method of claim 1, wherein, after the identification of the position where the first reference sub-image is displayed, the position identified is stored and associated with said first reference sub-image.

6. The method according to claim 5, wherein, during the step of monitoring, by the engine, a search for the second reference sub-image is carried out based on the position identified for the first reference sub-image.

7. A system for testing a graphical interface, programmed to execute a test program including performing automatically a validation test of a specification of the graphical interface for testing the graphical interface, the system comprising:
a processor; and
a memory having stored thereon the test program which, when executed by the processor, causes the system to:
develop a scenario file corresponding to the validation test to be performed, including a plurality of instructions written in a natural programming language, each instruction including a function, parameters of said function and an expected state of the graphical interface following the application of said function;
automatically perform the test by interpreting the scenario file so as to generate a plurality of commands, use an engine interacting with the graphical interface according to the plurality of commands, and monitor evolution of a current state of the graphical interface during the interaction of the engine with the graphical interface; and
analyze a result file associating each instruction of the scenario file with a result corresponding to the comparison of a current state of the graphical interface following the application of the corresponding command with the expected state,
wherein, during developing of the scenario file, reference sub-images that may be comprised in an image corresponding to the graphical interface are stored, the reference sub-images comprise at least a first reference sub-image and a second reference sub-image, and the expected state of the graphical interface is a pointer to a stored reference sub-image,
wherein automatically performing the test includes:
running, by the engine, a received command so as to perform the corresponding interaction on the graphical interface;
monitoring, by the engine, the graphical interface; and
comparing, by the engine, a current state of the graphical interface with the expected state received and generate the result of the comparison, wherein, during running, by the engine, the engine performs:
searching for the first reference sub-image in the image corresponding to the graphical interface and displayed on a monitor displaying the graphical interface;
identifying the position of the first reference sub-image searched for in the image displayed on the monitor; and
performing a selection operation in the position identified, the selection operation modifying the image displayed on the monitor, and
wherein, during monitoring, by the engine, the engine searches for the second reference sub-image in the image displayed on the monitor.

8. The system of claim 7, wherein the test program includes an environment, a driver and an engine, such that:
the environment allows an operator to develop a scenario file consisting of a list of instructions;
the driver interprets each instruction from the scenario file so as to generate, for each instruction, at least one equivalent command and sends the command to the engine; and
the engine interacts with the graphical interface according to the command received and monitors a current state of the graphical interface.

* * * * *